(12) United States Patent
Tsujimoto et al.

(10) Patent No.: US 12,200,175 B2
(45) Date of Patent: Jan. 14, 2025

(54) IMAGE FORMING APPARATUS FOR PERFORMING IMAGE FORMING OPERATION BASED ON DETECTED VALUE FROM DETECTOR AND AT LEAST ONE OF FIRST INFORMATION THAT IS NOT ACQUIRED BASED ON THE DETECTED VALUE OR SECOND INFORMATION ACQUIRED OUTSIDE THE IMAGE FORMING APPARATUS

(71) Applicant: Konica Minolta, Inc., Tokyo (JP)

(72) Inventors: Takahiro Tsujimoto, Toyokawa (JP); Akinori Kimata, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/217,032

(22) Filed: Jun. 30, 2023

(65) Prior Publication Data

US 2024/0007573 A1 Jan. 4, 2024

(30) Foreign Application Priority Data

Jul. 1, 2022 (JP) ................................ 2022-107000

(51) Int. Cl.
*H04N 1/00* (2006.01)
*H04N 1/21* (2006.01)

(52) U.S. Cl.
CPC ..... *H04N 1/00729* (2013.01); *H04N 1/00724* (2013.01); *H04N 1/00726* (2013.01)

(58) Field of Classification Search
CPC .......... H04N 1/00729; H04N 1/00724; H04N 1/00726; H04N 1/00763; H04N 1/00779; H04N 1/00806; H04N 1/00822
USPC ................................ 358/1.11–1.18; 347/16
See application file for complete search history.

(56) References Cited

U.S. PATENT DOCUMENTS

| | | | |
|---|---|---|---|
| 2015/0002573 A1* | 1/2015 | Kitahara | B41J 11/008 347/16 |
| 2020/0104656 A1* | 4/2020 | Akatsu | G03G 15/6514 |

FOREIGN PATENT DOCUMENTS

| | | | |
|---|---|---|---|
| JP | 2006321190 A | * | 11/2006 |
| JP | 2010010839 A | * | 1/2010 |
| JP | 2019095486 A | | 6/2019 |
| JP | 2021059451 A | * | 4/2021 |

* cited by examiner

*Primary Examiner* — Chad Dickerson
(74) *Attorney, Agent, or Firm* — Osha Bergman Watanabe & Burton LLP (57) ABSTRACT

An image forming apparatus that forms an image on a recording medium, including: a detector that detects a physical property of the recording medium and obtains a detection value; and a hardware processor that controls an operation of the image forming apparatus based on: the detection value detected by the detector, and at least one of: first information that relates to the recording medium and does not include the detection value or a physical property value calculated based on the detection value, and second information that does not relate to the recording medium and is acquired from outside of the image forming apparatus.

12 Claims, 8 Drawing Sheets

| NORTH AMERICA | | |
|---|---|---|
| SALES ORDER | MANUFACTURER | BRAND |
| 1 | A COMPANY | Aa |
| 2 | B COMPANY | Ba |
| 3 | B COMPANY | Bb |
| 4 | C COMPANY | Ca |
| 5 | A COMPANY | Ab |
| 6 | A COMPANY | Ac |

FIG.5B

| EUROPE | | |
|---|---|---|
| SALES ORDER | MANUFACTURER | BRAND |
| 1 | D COMPANY | Da |
| 2 | E COMPANY | Ea |
| 3 | F COMPANY | Fa |
| 4 | G COMPANY | Ga |
| 5 | H COMPANY | Ha |
| 6 | I COMPANY | Ia |

IMAGE FORMING APPARATUS FOR PERFORMING IMAGE FORMING OPERATION BASED ON DETECTED VALUE FROM DETECTOR AND AT LEAST ONE OF FIRST INFORMATION THAT IS NOT ACQUIRED BASED ON THE DETECTED VALUE OR SECOND INFORMATION ACQUIRED OUTSIDE THE IMAGE FORMING APPARATUS

CROSS-REFERENCE TO RELATED APPLICATIONS

The entire disclosure of Japanese Patent Application No. 2022-107000 filed on Jul. 1, 2022 is incorporated herein by reference.

BACKGROUND

Technical Field

The present disclosure relates to an image forming apparatus.

Description of Related Art

An image forming apparatus that forms and outputs an image on a recording medium appropriately adjusts various conditions (image forming conditions) for an image forming operation and a recording medium conveying operation in accordance with characteristics of the recording medium on which the image is formed. Thus, the image forming apparatus can stably convey the recording medium and form a high-quality image on the recording medium.

Various types of recording media may be used. It takes time and effort for the user to appropriately change the setting according to the recording medium. For this reason, when the change of the setting is omitted or the setting is improperly set, a trouble may occur in the image formation or the image quality may deteriorate. Japanese Unexamined Patent Publication No. 2019-095486 discloses a technology for automatically discriminating physical properties of a recording medium based on physical properties measured by a measuring sensor in an image forming apparatus having the measuring sensor that measures the physical properties of the recording medium. Japanese Unexamined Patent Publication No. 2021-059451 discloses a technology for inputting a plurality of acquired physical property values to a machine learning model to perform discrimination of a type of a recording medium.

However, due to a difference in measurement conditions of the measuring sensor or variations of the measuring sensor and the recording medium itself, there is a case where only the measured physical property value is insufficient as information to perform high-precision operation of the image forming apparatus.

SUMMARY

One or more embodiments of the present disclosure provide an image forming apparatus capable of operating with higher accuracy.

According to an aspect of the present invention, an image forming apparatus that forms an image on a recording medium includes: a detector that detects a physical property of the recording medium and obtains a detection value; and a hardware processor that controls an operation of the image forming apparatus based on: the detection value detected by the detector, and at least one of: first information that relates to the recording medium and does not include the detection value or a physical property value calculated based on the detection value, and second information that does not relate to the recording medium and is acquired from outside of the image forming apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, embodiments of the present disclosure will be described with reference to the drawings. However, the scope of the invention is not limited to the disclosed embodiments.

Figure 1:
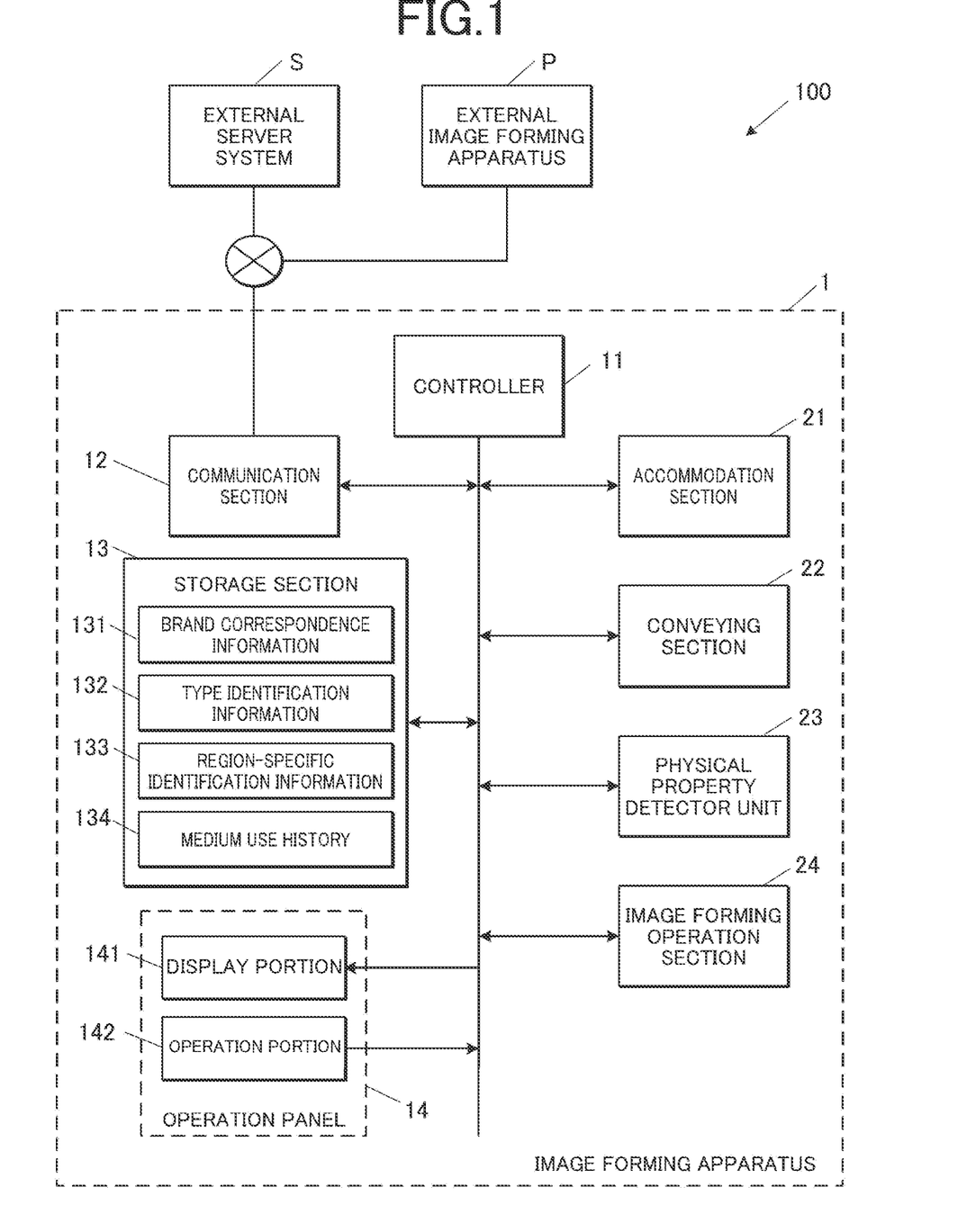
FIG. 1 is a block diagram illustrating a functional configuration of the image forming system.

FIG. 1 illustrates a block diagram illustrating the functional configuration of an image forming system 100 including the image forming apparatus 1 according to one or more embodiments.

The image forming system 100 may include an image forming apparatus 1, an external server system S, and an external image forming apparatus P (other image forming apparatus) that are communicably connected to each other via a network. The external image forming apparatus P is located, for example, in the same LAN or virtual private network (VPN) as the image forming apparatus 1. The LAN may be wired or wireless. The external image forming apparatus P may not be included in the image forming system 100 in a case where there is no corresponding device.

The external server system S is a server that manages various types of information related to operation of the image forming apparatus 1. The external server system S functions as a data bank that collects and manages information on various recording media that are distributed in the world and that can be used in the image forming apparatus 1. The information on the recording medium includes information on a brand name, a manufacturer, and various characteristics (physical properties) of each recording medium. The manufacturer may include a seller and a distributor (the same applies hereinafter). Information regarding properties includes those that are officially published (such as nominal basis weight) and those that are measured. In the external server system S, share information of a recording medium used in the world, information of a type of a recording medium mainly used for each business category, and the like are stored together. The external server system S may be a single server device or may be a system in which a separate database device or the like is connected to a server device that performs a control operation. The external server system S may be openly accessible, or may be accessible from a specific image forming apparatus 1 or a user thereof.

The number of external server systems S may not be one. A plurality of mirror servers or the like that synchronously hold the same data may exist in the world. In the synchronization referred to here, a time lag that is small compared to an update frequency is allowable. In this case, the image forming apparatus 1 may automatically determine an optimal access destination in accordance with the installation area of the image forming apparatus 1. Alternatively, a user may manually set an appropriate access destination by an input operation to an operation portion 142 or the like. The installation region is a region where the image forming apparatus 1 is used. The installation region may be determined from, for example, an IP address or the like, or information may be directly received and set by a user's input operation to the operation portion 142. The set access destination is not limited to one location. A plurality of locations may be set together with the priority order, and in a case where access to an access target continuously fails for a prescribed time or more, the access target may be automatically changed to an access destination with a lower priority order and the access may be performed.

The image forming apparatus 1 includes a controller 11, a communication section (or communication interface) 12, a storage section (or storage) 13, an operation panel 14, an accommodation section 21 (or accommodation unit), a conveying section (or a conveyor) 22, a physical property detector unit (or physical property detector) 23, an image forming operation section (image forming unit or image forming device) 24, and the like. The image forming apparatus 1 forms an image on a recording medium.

The controller 11 includes a hardware processor that controls various operations of the image forming apparatus 1. The hardware processor includes a central processing unit (CPU) that performs arithmetic processing. The CPU may be a single CPU, or a plurality of CPUs may operate in parallel or independently according to use. Further, the hardware processor may include a microcomputer other than a general-purpose CPU, various dedicated logic circuits, or the like.

The communication section 12 controls communication with an external device. The communication is performed in accordance with a predetermined communication standard. For example, the communication section 12 is capable of transmitting and receiving data in accordance with standards for a local area network (LAN) and/or WiFi. The communication section 12 includes a network card and the like, and can transmit a request and the like to an external device and receive (acquire) data and the like in response to the request. The external devices that are communication destinations include the server device of the external server system S and the external image forming apparatus P. The communication section 12 may have a connection terminal according to a universal serial bus (USB) or the like. When a detachably attachable device such as a USB memory is connected to the connection terminal, the communication section 12 may be able to control data transmission and reception with the device.

The storage section 13 includes a volatile memory (RAM) and a nonvolatile memory. The RAM provides a working memory space for the CPU and the like of the controller 11, and stores temporary data. The non-volatile memory includes, for example, a hard disk drive (HDD) or a flash memory. In the nonvolatile memory, a program or instructions for operation control, various kinds of setting data and the like are stored and saved.

The setting data includes, for example, brand correspondence information 131, type identification information 132, region-specific identification information 133, media use history 134 (use history), and the like. The brand correspondence information 131 stores a brand of a recording medium, a relationship between a type and a basis weight of the brand, and the like. The type identification information 132 and the region-specific identification information 133, which are attribute tables of the recording medium of one or more embodiments, will be described later. The media use history 134 stores and holds information for identifying a recording medium used for image formation in the image forming apparatus 1 together with its use frequency (the number of sheets subjected to image formation). The information for identifying the recording medium is, for example, the brand, and may additionally include the manufacturer, the seller, or the distributer. In a case where the brand is not specified, the information may include type information of the recording medium and data of a detection value and/or the basis weight.

The storage section 13 stores image data as a target to be formed, driving data for driving the image forming operation section 24 converted from the image data, and the like. These pieces of data may be stored in the RAM while the processing is being performed subsequent to the acquisition of the pieces of data. In a case where the image data and/or the driving data is continuously held after the image formation, or in a case where the temporary processing is interrupted or suspended until the image formation after the acquisition of the image data and/or the driving data, the image data and/or the driving data are appropriately moved to the non-volatile memory and stored and held as necessary.

The operation panel 14 includes a display portion 141 having a display screen, and an operation portion 142 having a touch screen or the like positioned so as to overlap the display screen. The display screen is not particularly limited, but is a liquid crystal display screen. The display screen can be displayed in full color or limited color under the control of the controller 11. The display portion 141 may include an LED lamp or the like as necessary. The LED lamp may be used for notification of a status or the like, or a plurality of LED lamps may be arranged to be used for an indicator or the like indicating a degree or the like. As the degree to be displayed, for example, a progress state of initial setting at the time of activation is exemplified.

The touch screen generates signals of a touch operation from a user or the like and the touched position (instruction operation), and outputs the generated signals to the controller 11. A method of detecting the touch operation may be any of well-known techniques, and is not particularly limited. In addition, the operation portion 142 may have other switches, for example, a push button switch, a rocker switch, or a rotation switch. For example, an input operation related to power supply such as switching on and off of a main power supply or switching to the standby state may be received by a specific push button switch or a rocker switch.

The accommodation section 21, the conveying section 22, the physical property detector unit 23, and the image forming operation section 24 are components corresponding to an actual image forming operation. The accommodation section 21 includes a tray (cassette) that accommodates a recording medium on which an image is formed. The accommodation section 21 may include a sensor that determines whether or not the recording medium is stored or that detects the size of the recording medium. The accommodation section 21 may include a plurality of trays, and any one is selected according to the setting. At the time of image formation, a new recording medium is sent and supplied from the selected tray.

The conveying section 22 sequentially takes out and sends out the recording medium from the accommodation section 21, and moves and transports the recording medium along a conveyance path for discharging the recording medium through an image forming position and a fixing position. The conveying section 22 may include, for example, a roller, an endless belt, and a guide member that defines a conveyance direction. The roller holds the recording medium and moves the recording medium at a speed and in a direction according to the rotation of the roller. The conveying section 22 may be capable of performing double-sided printing or switching a discharge destination of the recording medium after image formation, for example, a tray or a post-processing apparatus by appropriately moving the guide member to change the conveyance path.

The physical property detector unit 23 is installed at a predetermined position on the conveyance path of the conveying section 22, for example, on the downstream side of the accommodation section 21 and on the upstream side of a position where the image forming operation section 24 performs image formation. The physical property detector unit 23 includes a sensor that detects a physical property of the recording medium by measuring a physical quantity corresponding to the physical property of the recording medium being conveyed. The sensor includes, for example, a light emitter and a light receiver, and measures the intensity of light emitted and transmitted through the recording medium and the intensity of light emitted and reflected on the recording medium. The measured value (detection value) is output to the controller 11. That is, a portion between the light emitter and the light receiver of the transmitted light is a conveyance path, and the physical property detector unit 23 is installed with respect to the conveyance path such that the recording medium is transported and passes through the portion. The light receiver may be further capable of separately measuring the intensity of specular reflection light and the intensity of diffuse reflection light. The light emitter is capable of emitting light of each wavelength such as infrared (IR), blue (B), and green (G), for example. The light receiver can measure the incident intensity for each of these wavelengths. In addition, the physical property detector unit 23 may be able to measure some or all of the weight, thickness (that is, basis weight), bending strength, and the like of the recording medium.

The conveying section 22 may temporarily stop the conveyance of the recording medium at the measurement position by the physical property detector unit 23 before the image forming position, or may continue to convey and move the recording medium during the measurement.

The position of the physical property detector unit 23 may not be the position exemplified above, but the measurement may be performed without being affected by a change in the state of the medium surface or the like due to the image forming operation and the fixing operation.

The image forming operation section 24 applies a color material onto a recording medium and fixes the applied color material. The image forming operation section 24 is not particularly limited, but includes an engine that forms an image by an electrophotographic method. This engine forms (develops) a toner image of each of four colors of CMYK or the like on a photoreceptor based on image data indicating a formation content, and transfers the toner image to a recording medium via a transfer member. The image forming operation section 24 includes a fixing section that fixes the transferred toner on the recording medium by heating and pressing the toner with a roller or the like.

Next, operation of the image forming apparatus 1 will be described.

The image forming apparatus 1 specifies the properties of the recording medium on which an image is to be formed based on the value detected by the physical property detector unit 23. A medium type is specified based on the detection value of the physical property detector unit 23. If necessary, a finer classification (detailed classification) of the recording medium may be specified based on the medium type and the basis weight (physical property value).

The medium type is specified based on the type identification information 132. The type identification information 132 includes data indicating a correspondence relationship between the type of the recording medium, for example, plain sheet, coated sheet (gloss sheet, matte sheet), recycled sheet, colored sheet, index sheet, postcard, resin film (OHP sheet or the like), and the detection value of the physical property detector unit 23. In the type identification information 132, the type of the corresponding recording medium is determined for each range of a predetermined component or the like of the detection value of the physical property detector unit 23.

When the medium type is specified, the region-specific identification information 133 is referred to for some of the medium types, and the detailed classification of the recording medium is specified. When there is a difference in thickness or quality depending on the type of recording medium, for example, w % ben plain sheet, coated sheet, recycled sheet, or color sheet is specified as the type, the thickness is specified in each of a plurality of stages based on the basis weight. The thickness includes thin sheet, plain sheet, thick sheet, and the like. The thin sheet and the thick sheet may be further classified into a plurality of stages. The detailed classification such as the plain sheet and the colored sheet may further include quality. The quality includes high-quality sheet, medium-quality sheet, low-quality sheet (rough sheet), and the like.

According to one or more embodiments, the basis weight (physical property value) is obtained from the detection value obtained by the measurement of the physical property detector unit 23. Alternatively, the basis weight may be directly measurable as described above. The basis weight to be calculated (calculated basis weight) may slightly vary from the nominal value of each recording medium depending on the measurement condition, the variation of each recording medium, and/or the variation of the physical property detector unit 23 itself. Therefore, by setting the width with respect to the nominal value (nominal basis weight) in advance, the detailed classification of the recording medium can be specified according to the calculated basis weight.

Furthermore, the type and thickness of recording media often used vary from one region of the world to another. Region mentioned herein means a range in which the distribution of the recording medium is substantially common, and the region is a range including mainly a country or a plurality of neighboring countries having a common economic zone in at least a part thereof. Accordingly, the setting of the range of the basis weight is determined for each region. The image forming apparatus 1 can more accurately identify the detailed classification of the recording medium from the basis weight by using the setting corresponding to the position of the image forming apparatus 1, that is, the region where the image forming apparatus 1 is used. The correspondence between the basis weight measurement range predetermined for each region and the detailed classification of the recording medium is stored and held in advance as initial data in the region-specific identification information 133. Thereafter, in the region-specific identification information 133, data in which a necessary part is adjusted (changed) as described later is additionally stored. The initial data itself may be updatable in accordance with a market trend. The update data can be stored in, for example, the external server system S. The external server system S may be capable of distributing the update data to each image forming apparatus 1.

The OHP sheet and the envelope do not necessarily have to be specified to the detailed classification in terms of setting of image forming conditions.

The image forming apparatus 1 may acquire the region information by, for example, receiving an input operation that a user or a manager of the image forming apparatus 1 performs on the operation panel 14 (operation portion 142) of the image forming apparatus 1. Alternatively, identification information of the region to which an IP address set in the image forming apparatus 1 is allocated may be acquired from the outside. The region information is information other than the recording medium of one or more embodiments, and corresponds to second information acquired from the outside of the image forming apparatus 1. Here, the outside includes a person who performs an input operation such as a user.

Figure 2A:
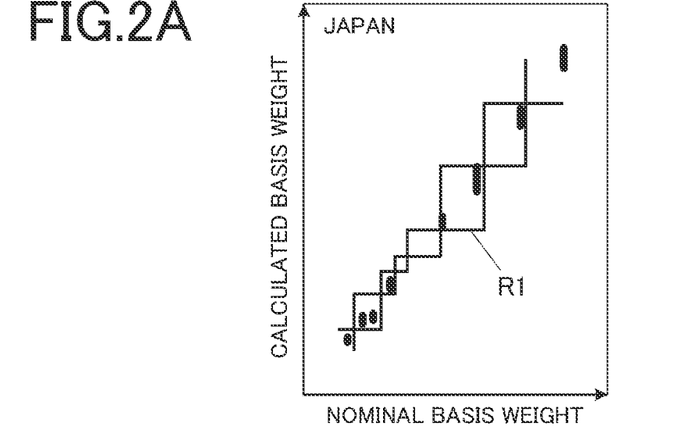
FIG. 2A is a diagram illustrating an example of an identification range of a recording medium in Japan.
Figure 2B:
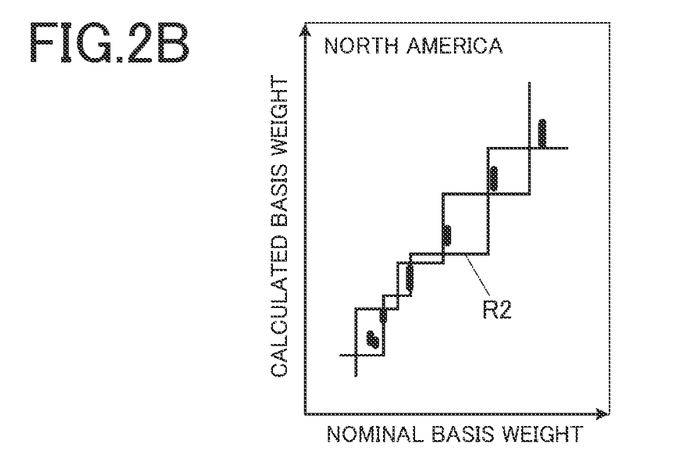
FIG. 2B is a diagram illustrating an example of an identification range of a recording medium in North America.
Figure 2C:
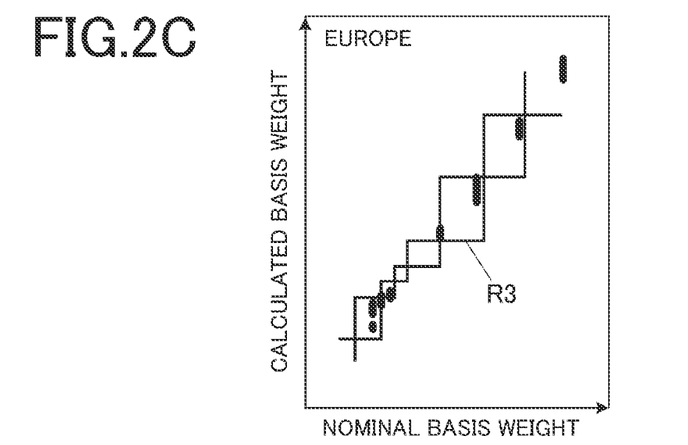
FIG. 2C is a diagram showing an example of an identification range of a recording medium in Europe.

FIG. 2A to FIG. 2C are diagrams illustrating examples of an identification range of recording media in each region. FIG. 2A illustrates an identification range in Japanese identification information, FIG. 2B illustrates an identification range in North American identification information, and FIG. 2C illustrates an identification range in European identification information.

In each of FIG. 2A to FIG. 2C, the abscissa represents a nominal basis weight, and the ordinate represents a basis weight calculated by using the values measured by the physical property detector unit 23 of the image forming apparatus 1. As described above, for the plain sheet, a frame-shaped range that is continuous without overlap is set for each of eight ranges (identification ranges R1 to R3) ranging from thin sheet (low basis weight) to thick sheet (high basis weight). Based on the calculated basis weight, a range to which the basis weight belongs is specified. The recording medium is specified as the plain sheet having a thickness corresponding to the nominal basis weight corresponding to the specified range.

A set of points arranged on a thick line in the vertical direction indicates an example of the range of the calculated basis weight measured on the recording medium on which a stable image forming operation has been confirmed in the image forming apparatus 1. Since the number of recording media actually used is limited, the points are located at intervals for each of the recording media on the horizontal axis (nominal basis weight). The basis weight calculated based on the measurement result by the physical property detector unit 23 for each recording medium has a certain width even in the same detailed classification. The identification ranges appropriately divided may be set such that the specified results of the respective recording media belonging to the same detailed classification do not vary over the identification ranges of different detailed classifications.

Figure 3A:
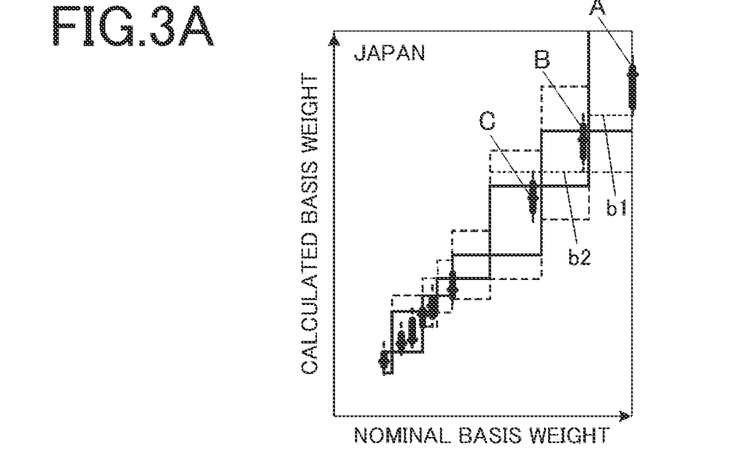
FIG. 3A is a view illustrating an example of adjustment of an identification range according to a calculated basis weight.
Figure 3B:
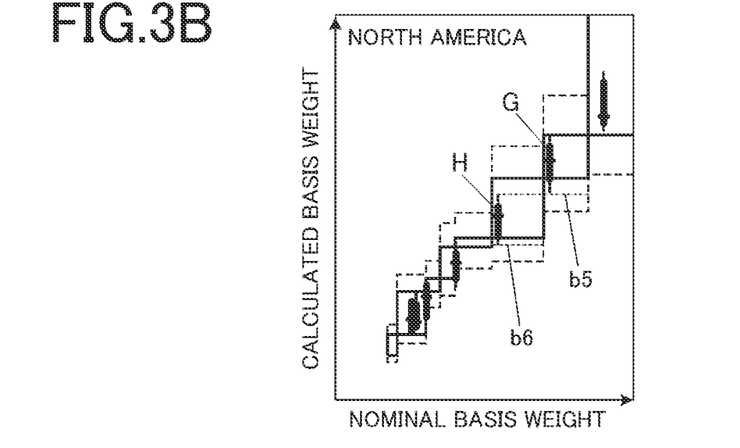
FIG. 3B is a view illustrating an example of adjustment of an identification range according to a calculated basis weight.
Figure 3C:
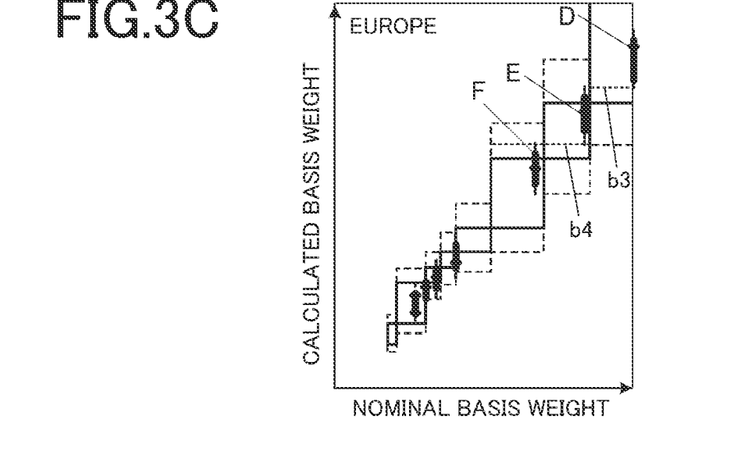
FIG. 3C is a view illustrating an example of adjustment of an identification range according to a calculated basis weight.

FIG. 3A to FIG. 3C are diagrams illustrating examples of adjustment of the identification range according to the calculated basis weight.

The calculated basis weight may protrude from the identification range (solid line frame) shown in FIG. 2A to FIG. 2C. The recording medium that protrudes from the identification range in this way is erroneously specified as the detailed classification of the recording medium set corresponding to the protruding range.

Depending on where the nominal basis weight of the actually used recording medium is located within the identification range, the calculated basis weight may be biased toward the upper side or the lower side of the identification range. For example, in the example of the identification information for Japan illustrated in FIG. 3A, the nominal basis weights of the used sheet A, sheet B, and sheet C are all biased to the vicinity of the upper end (toward the right in the figure) of the identification range. Accordingly, the calculated basis weights are all biased to protrude from the upper side of the identification range. Therefore, by shifting the boundaries of these three identification ranges to the upper side to be the boundaries b1 and b2, it is possible to prevent the respective recording media from being specified by mistake.

Also in the example of the identification information for Europe illustrated in FIG. 3C, the nominal basis weights of the used sheet D, sheet E. and sheet F are all biased to the vicinity of the upper end of the identification range. Accordingly, the calculated basis weight protrudes from the upper side of the identification range. Therefore, by shifting each of the boundaries of these three identification ranges to the upper side to be the boundaries b3 and b4, it is possible to prevent each recording medium from being erroneously specified.

On the other hand, in the example of the identification information for the United States illustrated in FIG. 3B, the nominal basis weights of the used sheet G and the sheet H are biased to the vicinity of the lower end (toward the left in the drawing) of the identification range. Accordingly, the calculated basis weight is close to the lower end of the identification range, and a part thereof protrudes below the identification range. Therefore, by shifting the lower ends of these two identification ranges to the lower side and setting them as the boundaries b5 and b6, it is possible to reduce errors in the identification result.

In FIG. 3A to FIG. 3C, a shiftable range is indicated by a dotted line in advance. If the measurement conditions or the physical property detector unit 23 are significantly out of the appropriate range, it is necessary to improve the measurement conditions or adjust the physical property detector unit 23 rather than accurately specify a recording medium. In addition, even if the recording medium is classified based on the nominal value for an inferior sheet having a significant variation in the recording medium itself, the recording medium is actually out of the classification, and thus the classification itself based on the nominal basis weight is inappropriate.

The combination of the type and the detailed classification of the recording medium actually used by the user of the business-oriented image forming apparatus 1 is actually limited to a very small part of various combinations distributed in the market. Some users may use only a single type of recording medium for image formation. Even if a plurality of types of recording media are used, they are only selectively used according to, for example, the purpose of being used mainly for in-house work or the like and the purpose of being used for submission or distribution to the outside of the company, or the like. The content of this combination varies depending on the business category.

Figure 4:
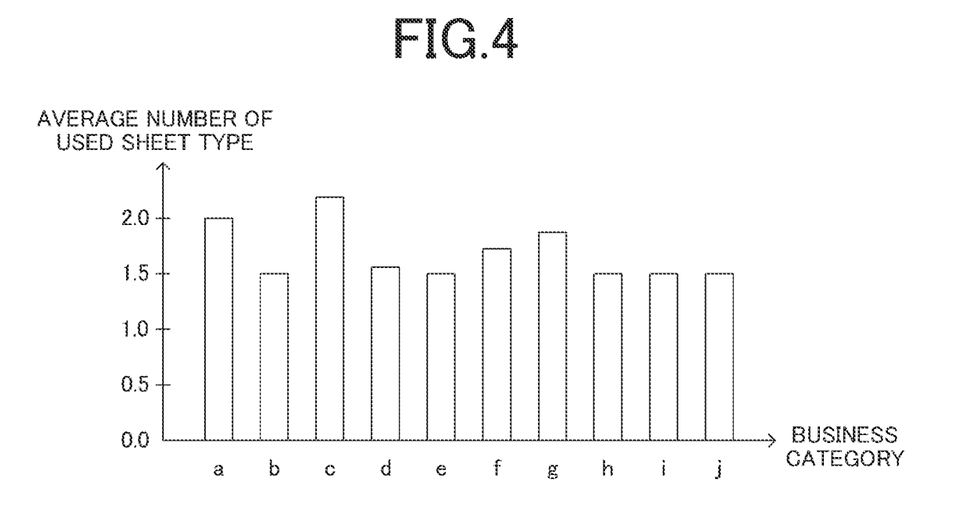
FIG. 4 is a diagram showing an average value of the number of sheet types used for each business category.

FIG. 4 is a diagram illustrating, for each business category, the average value of the number of sheet types (types and detailed classifications) that are used.

In some business categories (business category a), image formation may be performed on an average of two or more types of sheet types. However, in general, the average of the number of sheet types on which users of each business category perform image formation with the image forming apparatus 1 is two or less. That is, actually, each image forming apparatus 1 does not have to be able to accurately identify all of the many types of recording media as in the cases of FIG. 2A to FIG. 2C and FIG. 3A to FIG. 3C described above. These include the difference in the type of the recording medium. For example, while plain sheet or recycled sheet is generally used in normal business or the like, coated sheet, or high-quality sheet among plain sheets, is used for documents and booklets (pamphlets, brochures, and the like) to be submitted and distributed to the outside. Therefore, it is sufficient that the image forming apparatus 1 can identify about two to three types of detailed classifications within the same type. In particular, a situation where recording media of the same type and having a similar basis weight are used differently depending on a detailed purpose is hardly expected in the image forming apparatus 1.

The business category information (second information) is not particularly limited, but may be acquired by receiving an input operation to the operation panel 14 (operation portion 142) of the image forming apparatus 1. The input operation may be performed by, for example, the user or the manager of the image forming apparatus 1 at the time of initial setting or the like. In addition, for example, information such as a type of a recording medium which is generally used and has a high use frequency in the obtained business category is acquired from the external server system S. This corresponds to information for the operation based on the second information in one or more embodiments. Based on this information, the medium type and the detailed classification to be preferentially identified are specified. If there is an external image forming apparatus P communicably connected to the image forming apparatus 1 on the same LAN or the like, the information may be acquired from the external image forming apparatus P. The image forming apparatus 1 checks whether information on, for example, a recording medium of the same business category that is frequently used has been previously acquired and stored in the external image forming apparatus P. In a case where information such as a recording medium with a high use frequency is stored, the image forming apparatus 1 may acquire the information via a LAN (network) by the communication section 12. Alternatively, these pieces of information may be acquired from a removable portable storage medium such as a USB memory (flash memory). A portable storage medium storing the information is connected to a connection terminal of the communication section 12, and thus the information can be acquired.

In addition, generally, brands of recording media distributed in respective regions are those in which reliability regarding quality and a supply amount is guaranteed to some extent, and are likely to be biased to those excellent in cost-effectiveness performance. In particular, this tendency is particularly seen in a recording medium used for office use. The brand to be distributed is specified by, for example, a brand or a manufacturer Therefore, based on the region information (second information), information (share information) of a recording medium having a high use frequency may be acquired from the external server system S or the like, and may be used to adjust the identification range of the recording medium in the image forming apparatus 1. The information of the recording medium having a high use frequency corresponds to information related to an operation based on the second information of one or more embodiments.

Figure 5A:
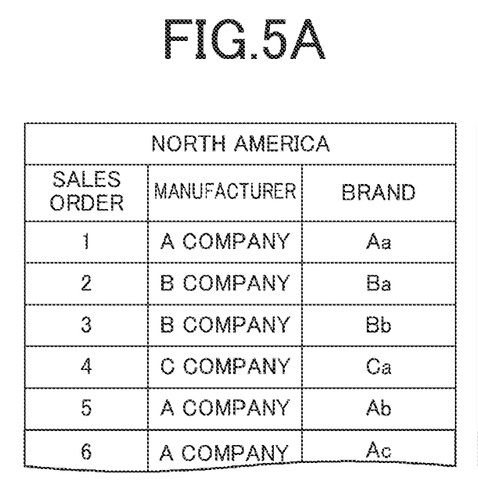
FIG. 5A is a diagram illustrating an example of share information of a recording medium used in North America.
Figure 5B:
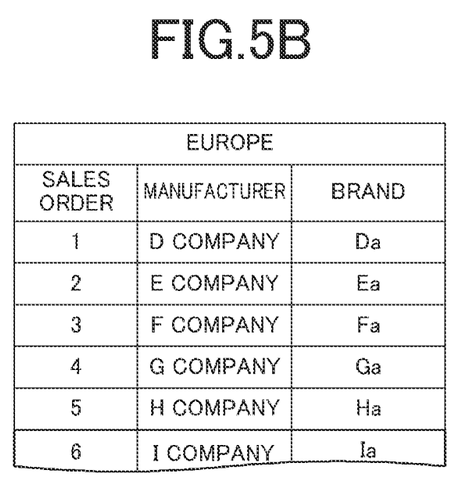
FIG. 5B is a diagram showing an example of share information of a recording medium used in Europe.

FIG. 5A and FIG. 5B are diagrams showing examples of share information of a recording medium used in each region.

As described above, FIG. 5A and FIG. 5B show that the manufactures of the brands of the recording media that are frequently used in North America and Europe are completely different from each other. The image forming apparatus 1 acquires, for example, the latest information on the type and the nominal basis weight of such a high-share recording medium from the outside as the information on the recording medium having a high use frequency. The image forming apparatus 1 may expand or shift the identification range such that the basis weight calculated from the detection value is less likely to protrude from the identification range w % ben such recording media are actually used.

Alternatively, the adjustment of the identification range for preferentially identifying the type and basis weight of the recording medium to be actually used may be performed regardless of the business category or the like. For example, the adjustment of the identification range may be performed based on the media use history 134. In this case, for example, the identification range may be adjusted periodically every time a specified number of times of the image forming operation are performed or in response to a predetermined input operation to the operation portion 142 by the user. The media use history 134 may be used for weighting according to the use frequency, for example. In one or more embodiments, the media use history 134 corresponds to first information which is information relating to the recording medium other than the detection value/physical property value acquired in the image forming apparatus 1.

That is, the image forming apparatus 1 can specify the medium type and the detailed classification more accurately than in the related art based on not only the detection value of the physical property detector unit 23 but also the first information and the second information. Since the image forming condition can be set more appropriately based on the specifying result, the image forming apparatus 1 can form an image with high accuracy and stability. In addition, it is also possible to perform an operation of determining the brand and the type of the recording medium, the nominal basis weight of the brand, and the like with higher accuracy based on the specified content, and display the same on the display portion 141 or the like to be shown to the user.

Figure 6:
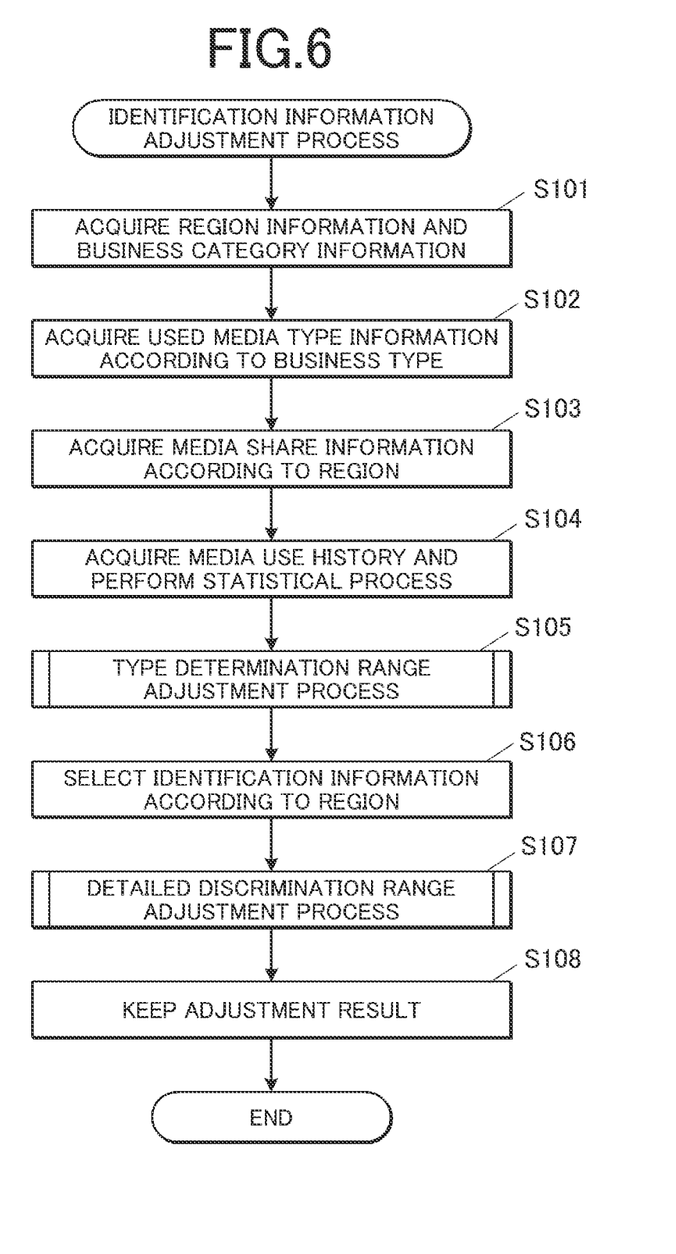
FIG. 6 is a flowchart illustrating a control procedure of an identification information adjustment process.

FIG. 6 is a flowchart illustrating a control procedure of an identification information adjustment process executed by the controller 11 in the image forming apparatus 1. This processing is started, for example, at the time of initial setting of the image forming apparatus 1, when image formation of a predetermined reference number of sheets is performed, or when an input operation related to an execution command of this processing is received.

When the identification information adjustment processing is started, the controller 11 acquires region information and business category information (step S101). As described above, these pieces of information are received by, for example, an input operation to the operation portion 142 by the user. When these pieces of information have been acquired once, the acquired information may be stored in the storage section 13 and read out again. Alternatively, as described above, the region information may be externally acquired based on the IP address of the image forming apparatus 1 or information on a router.

The controller 11 acquires the type information of the used media corresponding to the acquired business category (step S102). For example, the controller 11 specifies the business category to the external server system S, requests type information on the medium in use, and receives data transmitted by the external server system S.

The controller 11 acquires media share information corresponding to the region in which the image forming apparatus 1 is located (step S103). For example, the controller 11 requests the external server system S for share information of a recording medium used in a specified area, and receives data transmitted from the external server system S.

The controller 11 acquires the media use history 134 of the image forming apparatus 1 and statistically processes the media use history 134 (step S104). The statistical processing is, for example, counting of the total use frequency of each recording medium and/or creation of a frequency distribution of the basis weight and the physical property value/detection value calculated for each recording medium of each sheet type (type and detailed classification). Note that these processes may be periodically performed in the image forming apparatus 1 separately from the identification information adjustment process. In this case, the controller 11 may acquire the counted communication use frequency and/or the created frequency information in step S104.

The controller 11 executes type determination range adjustment processing (step S105).

The controller 11 selects identification information corresponding to the region where the image forming apparatus 1 is located from the region-specific identification information 133 (step S106). The controller 11 executes a detailed discrimination range adjustment process (step S107).

The controller 11 stores and saves, in the storage section 13, the type identification information 132 and the region-specific identification information 133 that have been adjusted in the type determination range adjustment processing (step S108). The adjusted data may be stored in the storage section 13 separately from the initial data, and may be returned to the initial state in response to a predetermined input operation. The controller 11 ends the identification information adjustment processing.

Figure 7A:
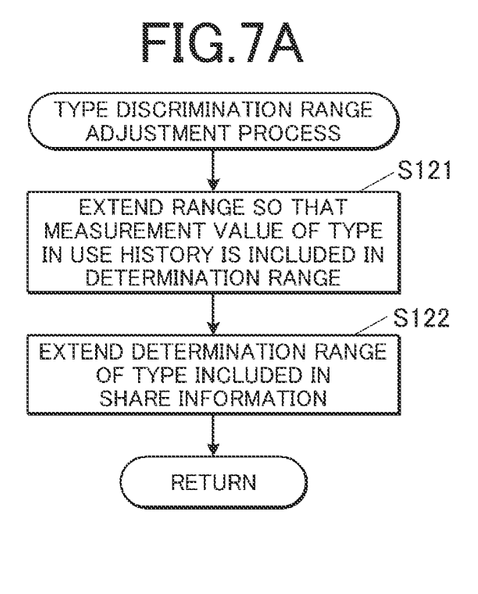
FIG. 7A is a flowchart of a type determination range adjustment process.
Figure 7B:
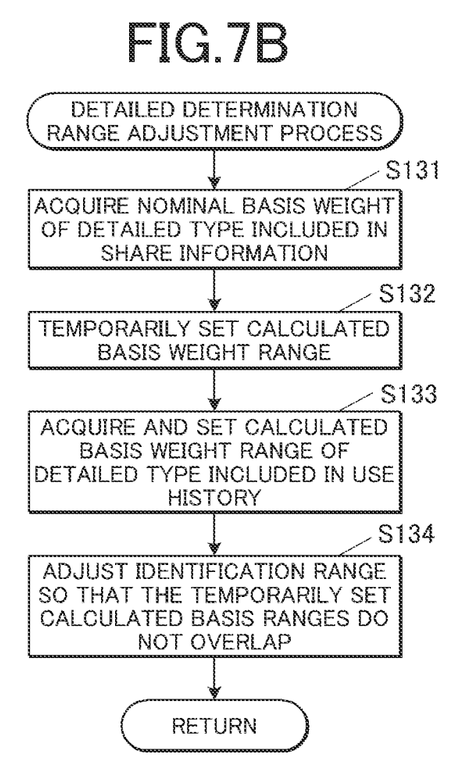
FIG. 7B is a flowchart of the detailed determination range adjustment process.

FIG. 7A is a flowchart of a type determination range adjustment process invoked in an identification information adjustment process. FIG. 7B is a flowchart of the detailed discrimination range adjustment processing invoked in the identification information adjustment processing.

As shown in FIG. 7A, when the type determination range adjustment process is invoked, the controller 11 extends and adjusts the determination range such that the measurement values of the recording media of the types included in the media use history 134, that is, the types used so far are included in the determination range of the types (step S121).

The controller 11 extends and adjusts the determination range for each type included in the acquired share information within a range that does not hinder the determination of the type included in the media use history 134 (step S122). The controller 11 ends the type determination range adjustment processing and returns the processing to the identification information adjustment processing.

As illustrated in FIG. 7B, when the detailed determination range adjustment processing is invoked, the controller 11 acquires a nominal basis weight of the detailed category included in the acquired share information (step S131). The controller 11 temporarily sets the range of the calculated basis weight of these detailed classifications (step S132). The temporarily set range may be simply a range of the calculated basis weight in the identification range including the nominal basis weight. Alternatively, the controller 11 may slightly narrow the range of the calculated basis weight of the identification range depending on how much the obtained nominal basis weight is close to the large side or the small side in the identification range.

The controller 11 obtains a range of calculated basis weights for each detailed classification included in the media use history 134. In a case where the detailed classification is the same as that included in the share information, the controller 11 replaces the calculation range of the temporary setting with the acquired calculation basis weight range (step S133).

The controller 11 adjusts the identification range such that the set (or temporarily set) calculated basis weight ranges do not overlap each other as much as possible (step S134). The controller 11 ends the detailed discrimination range adjustment processing and returns the processing to the identification information adjustment processing.

As described above, in the type identification information 132 and the region-specific identification information 133 in which the discrimination range is determined for each region and/or business category, the discrimination range of each type and detailed classification can be adjusted such that the brand that is actually used and the brand that is relatively easily used are preferentially and correctly recognized.

Figure 8:
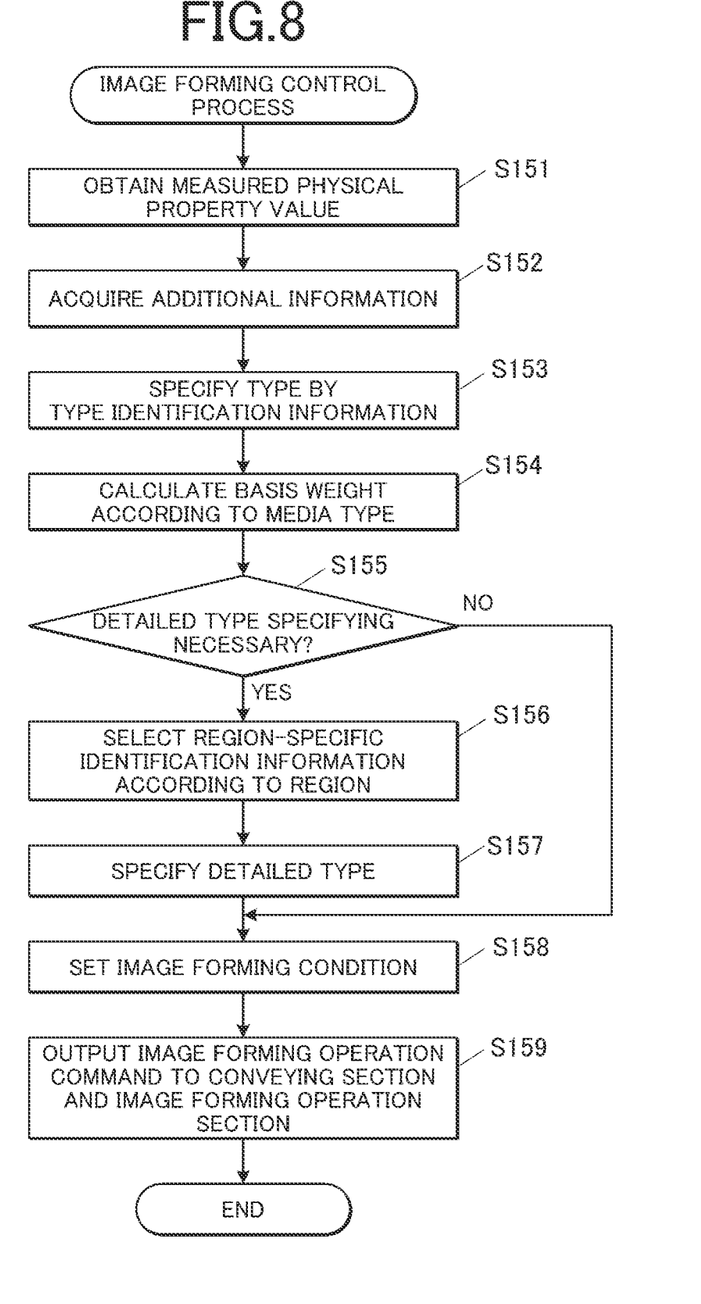
FIG. 8 is a flowchart illustrating a control procedure of an image forming control process related to an image forming operation.

FIG. 8 is a flowchart showing a control procedure by the controller 11 of the image forming control processing relating to the image forming operation. This image forming control processing is executed when an image formation instruction for a specified image (image data) on a specified recording medium is received.

The controller 11 causes the physical property detector unit 23 to measure the physical properties of the recording media to be subjected to image formation sent out from the accommodation section 21, and acquires the detection values from the physical property detector unit 23 (step S151). The controller 11 acquires region information, business category information, and the like, as additional information (step S152). If these data have already been acquired in the identification information adjustment processing, the stored data that have been acquired may be read as they are.

The controller 11 specifies the medium type by the type identification information 132 (step S153). The type identification information 132 is adjusted according to the region and/or the business category as described above. The controller 11 calculates the basis weight according to the specified type from the acquired detection value (step S154).

The controller 11 determines whether or not the specified medium type needs to specify a more detailed classification (step S155). As described above, in a case where the medium type is the plain sheet, coated sheet, color sheet, recycled sheet, or the like, it is determined that the detailed classification needs to be specified (step S155; YES). The controller 11 selects region-specific identification information corresponding to the region (step S156). Since the number of pieces of adjusted identification information is usually one, the adjusted identification information may be simply acquired. The controller 11 specifies the detailed classification based on the selected and acquired identification information and the calculated basis weight (step S157). The processing of the controller 11 then proceeds to step S158. When the medium type is an OHP (resin film), an envelope, or the like, it is determined that it is not necessary to specify further detailed classification (step S155; NO). The processing of the controller 11 then proceeds to step S158.

The controller 11 sets image forming conditions based on the specified medium type and detailed category (basis weight) (step S158). Alternatively, the controller 11 may set the image forming condition based on the medium type and the detection value of the measurement result. The controller 11 outputs a command to perform an image forming operation to the conveying section 22 and the image forming operation section 24 (step S159). The controller 11 ends the image forming control processing.

In the above description, the image forming apparatus 1 can acquire the image forming condition by holding the correspondence relationship between the medium type and the detailed classification (basis weight) and the setting of the image forming condition, but the present invention is not limited thereto. Instead of the image forming apparatus 1 holding the correspondence relationship, the image forming apparatus 1 may transmit the medium type and the detailed classification (basis weight) to the external server system S or the like to request information on the image forming condition, and may acquire data transmitted from the external server system S to set the image forming condition.

Figure 9:
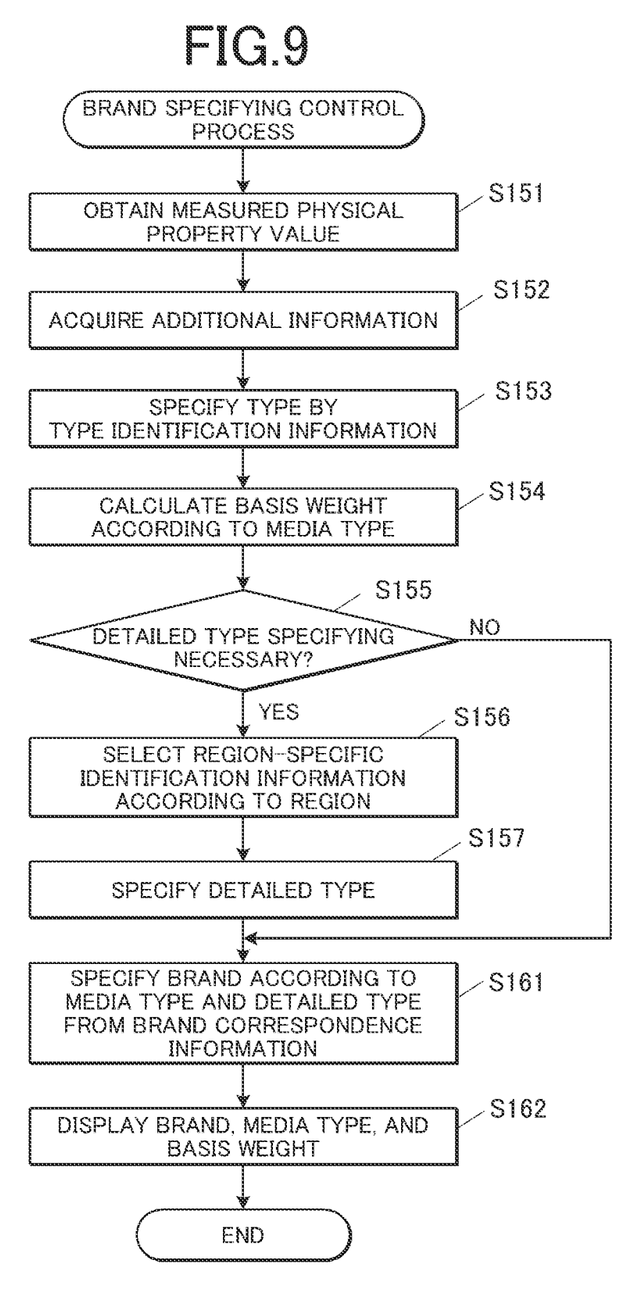
FIG. 9 is a flowchart illustrating a control procedure of a brand specifying control process.

FIG. 9 is a flowchart illustrating a control procedure by the controller 11 of the brand specifying control process executed in the image forming apparatus 1. The brand specifying control process is executed, for example, when an input operation related to a request to display the specified result of the recording medium accommodated in the accommodation section 21 is received from the user.

In the brand specifying control process, processes of steps S161 and S162 are added after the processes of steps S151 to S157 of the image forming control process. Detailed description of processing content that overlaps with that of the image forming control processing is omitted.

In the case of branching to NO in step S155, and after the processing of step S157, the controller 11 specifies the brand according to the specified medium type and detailed classification with reference to the brand correspondence information 131 (step S161). The controller 11 causes the display portion 141 to display the specified brand, medium type, and calculated basis weight (step S162). The controller 11 ends the brand specifying control process.

The image forming apparatus 1 may not hold the brand correspondence information 131, and the controller 11 may transmit the medium type, the physical property value/detection value, and the region information to the external server system S via the communication section 12 to request the brand information.

As described above, the image forming apparatus 1 according to one or more embodiments for forming an image on a recording medium includes the physical property detector unit 23 for detecting the physical property of the recording medium, and the controller 11. The controller 11 controls the operation of the image forming apparatus 1 based on the first information or the second information and the detection value detected by the physical property detector unit 23. The first information relates to the recording medium and does not include the detection value detected by the physical property detector unit 23 or the physical property value calculated based on the detection value, and includes, for example, the media use history 134. The second information does not relate to the recording medium and is acquired from the outside of the image forming apparatus 1, and includes, for example, an installed region (or an installation position) of the image forming apparatus 1 and/or the business category of the user of the image forming apparatus 1. The acquisition from the outside includes input to the operation portion 142 by a user or the like. The information on the recording medium may be insufficient for an appropriate operation of the image forming apparatus 1 only with the detection result of the physical property detector unit 23. By adding the first information or the second information to the information to be acquired, the image forming apparatus 1 can perform an operation with higher accuracy than before without taking time and effort.

The first information may include the media use history 134 of the recording medium in the image forming apparatus 1. By using the media use history 134 of the image forming apparatus 1, the image forming apparatus 1 can preferentially and accurately determine a recording medium that is actually used, and perform an image forming operation and/or brand specification/display.

The second information acquired from the outside of the image forming apparatus 1 may include information on the business category in which the image forming apparatus 1 is used. The second information is information not directly related to the recording medium. However, the recording media used for image formation varies depending on the business category. Therefore, the image forming apparatus 1 appropriately determines the recording medium to be preferentially discriminated with high accuracy, and thus it is possible to reduce as a whole the probability that the recording medium is erroneously specified or an inappropriate operation is performed due to erroneous specification.

In addition, the second information may include information on a position where the image forming apparatus 1 is installed (used region). The used region is not directly related to the recording medium. However, the recording medium which is frequently used is different in each region of the world. Therefore, the image forming apparatus 1 can preferentially and accurately determine a recording medium corresponding to the used region, and thus can perform an image forming operation and brand identification/display with high accuracy as a whole.

Furthermore, the image forming apparatus 1 includes the operation portion 142 that receives an input from a user. The second information may be information input by the user through the operation portion 142. For example, the information such as the used region or the business category of the user as described above is grasped by the user himself/herself, and the input operation is also easy. Accordingly, since the above information is input by the user, the image forming apparatus 1 can easily acquire accurate information. This allows the image forming apparatus 1 to perform various operations related to the characteristics of the recording medium with higher accuracy as described above.

The above-described operation may be an operation of changing the attribute table of the recording medium stored in the image forming apparatus 1, that is, the type identification information 132 and/or the region-specific identification information 133. The image forming apparatus 1 can specify a recording medium more accurately by changing the attribute table such that a recording medium that is actually used or a recording medium that is likely to be used assumed from information such as the used region and/or the business category, can be preferentially determined with high accuracy.

Alternatively, the operation may be the operation of determining the image forming condition for forming the image on the recording medium detected by the physical property detector unit 23. The type and basis weight (physical property value) of the recording medium or the detection value of the measurement result are used to determine the image forming conditions. The image forming apparatus 1 can determine the image forming conditions more stably and accurately by using the first information or the second information together when specifying the type and/or the nominal basis weight. In particular, the image forming apparatus 1 accurately determines the image forming condition effectively in a case where the determination may vary depending only on the detection value and the calculated basis weight.

The above-described operation may be an operation of determining at least one of the brand, the type, and the basis weight of the recording medium detected by the physical property detector unit 23. Even when the image forming apparatus 1 specifies the brand and/or the nominal basis weight from the detection value, the image forming apparatus 1 can adjust the specific criterion such that the brand and the nominal basis weight of the recording medium having a high possibility of being used are preferentially selected based on the information of the media use history, the used region, and the business category as described above. Therefore, the image forming apparatus 1 can determine the brand and/or the nominal basis weight more accurately than in the related art.

Further, the information for the operation based on the second information may be acquired from an external image forming apparatus P connected to the image forming apparatus 1 via a network. That is, the image forming apparatus 1 can acquire data on the type, brand, and nominal basis weight of the recording medium that is frequently used according to the used region and/or the business category, particularly from the external image forming apparatus P used for the same purpose in the same LAN. Thus, the image forming apparatus 1 can easily adjust the settings among the image forming apparatuses, and can perform high-precision operation without any deformation.

Alternatively, the information for the operation based on the second information may be acquired from the external server system S that is connected to the image forming apparatus 1 via a network and manages the information related to the operation. Since such information is collectively managed by the external server system S and can be easily accessed by the image forming apparatuses 1 around the world, it is easy to manage the provided data of the external server system S such that the quality of the provided data becomes the latest. Therefore, the image forming apparatus 1 can easily acquire suitable data and improve the accuracy of the operation related to the characteristics of the recording medium.

Alternatively, the information for the operation based on the second information may be acquired from a storage medium connected to the image forming apparatus 1. Here, "connected" does not mean always connected, but means a state in which a detachable storage medium (portable storage medium or the like) is temporarily connected. As described above, the information may not be acquired directly via the network. In addition, the image forming apparatus 1 can easily acquire desired information and improve the accuracy of the operation related to the characteristics of the recording medium without the user or the like setting a connection destination for acquiring information.

The image forming apparatus 1 also includes the accommodation section 21 that contains the recording medium and the conveying section 22 that transports the recording medium contained in the accommodation section 21 along the conveyance path. The physical property detector unit 23 is installed at a predetermined position of the conveyance path, and detects the physical property of the recording medium conveyed by the conveying section 22.

As described above, image forming apparatus 1 may be able to detect the physical property of the recording medium on the normal conveyance path using an in-line sensor. This eliminates the need for the user to set a separate recording medium for reading and image formation. Further, since the reading can be performed during the conveyance of the recording medium, the image forming apparatus 1 can promptly reflect the reading result on the image forming operation, the conveying operation, and the like.

Note that the present disclosure is not limited to the above-described embodiments, and various modifications are possible.

For example, in the above-described embodiments, the first information is the media use history 134, and the second information is the used region and the business category, but the present disclosure is not limited to the above. The first information and/or the second information may be any other information as long as it leads to information that can narrow down recording media that are frequently used.

Although it has been described in the aforementioned embodiments that the second information is received by the operation portion 142 and the used region is determined based on the IP address or the like, other configurations may be used.

Further, it is not necessary to acquire all of the type identification information 132 and the region-specific identification information 133 from the same external server system S. Some pieces of information may be acquired from different server systems. Alternatively, one of the data may be held in the image forming apparatus 1 in advance, or may be acquired from another electronic computer in the LAN.

Although information such as the specified brand of the recording medium is displayed on the display portion 141 in the exemplary embodiments, the present invention is not limited thereto. For example, the specified information may be output as data to an external print server or terminal device. In addition, the determination content of the display and output target may not be limited to the brand, the type, and the basis weight, and conversely, may be only a part of these.

Further, the image forming apparatus 1 may not bean electrophotographic method image forming apparatus. For example, the image forming apparatus 1 may be an inkjet method that ejects ink to form an image.

Further, the image forming apparatus 1 may not directly communicate with the external server system S and/or the external image forming apparatus P to acquire necessary data. For example, the print server may communicate with another electronic device to acquire necessary information, and the image forming apparatus 1 may acquire all external information via the print server.

In the above-described embodiments, the portable storage medium that stores the information related to the second information is a USB memory, but is not limited thereto. The portable storage medium may be a CD-ROM, a digital versatile disc (DVD), or the like, or may be any other medium that can be connected to store data such that the data can be temporarily read.

Further, the physical property detector unit 23 may not be located so as to be measurable on the conveyance path. The physical property detector unit 23 may be capable of performing measurement in the accommodation section 21, or may separately measure the physical property of the recording medium set at a read-only position.

In addition, the physical property detector unit 23 may further have a configuration other than the detection of the intensity of transmitted light/reflected light or the direct detection of the basis weight, or may detect physical properties by other methods.

Further, the storage section 13 is not limited to a storage unit built in the image forming apparatus 1. The storage section 13 may be an external auxiliary storage device, a network drive, or a storage area on the cloud.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus that forms an image on a recording medium, the image forming apparatus comprising:
   a sensor that comprises a light emitter and a light receiver and detects a property of the recording medium to obtain a detection value;
   a storage that stores a correspondence between the property of the recording medium and a type of the recording medium; and
   a hardware processor that:
      adjusts the correspondence stored in the storage based on:
         first information that relates to the recording medium and does not include a property value calculated based on the detection value, or
         second information that does not relate to the recording medium and is acquired from outside of the image forming apparatus,
      specifies the type of the recording medium from the property of the recording medium based on the adjusted correspondence,
      controls an operation in the image forming apparatus based on the detection value detected by the sensor and the type of the recording medium,
      upon determining that a detailed classification is needed based on the type of the recording medium, specifies the detailed classification of the recording medium based on the second information and the property of the recording medium, and
      controls the operation in the image forming apparatus based on the detailed classification of the recording medium.

2. The image forming apparatus according to claim 1, wherein the first information includes a use history of the recording medium in the image forming apparatus.

3. The image forming apparatus according to claim 1, wherein the second information includes a business category in which the image forming apparatus is used.

4. The image forming apparatus according to claim 1, wherein the second information includes an installation position of the image forming apparatus.

5. The image forming apparatus according to claim 1, further comprising:
   an operation panel that receives an input from a user, wherein
   the second information is input by the user through the operation panel.

6. The image forming apparatus according to claim 1, further comprising:
   a storage that stores, as the correspondence, an attribute table of the recording medium, wherein
   the hardware processor controls changing the attribute table stored in the storage.

7. The image forming apparatus according to claim 1, wherein the hardware processor controls determining an image forming condition to form an image on the recording medium detected by the sensor.

8. The image forming apparatus according to claim 1, wherein the hardware processor controls determining at least one of a brand, a type, and a basis weight of the recording medium detected by the sensor.

9. The image forming apparatus according to claim 1, wherein the hardware processor acquires information for the operation based on the second information from another image forming apparatus connected to the image forming apparatus via a network.

10. The image forming apparatus according to claim 1, wherein the hardware processor acquires information for the operation based on the second information from a server that is connected to the image forming apparatus via a network and that manages the information on the operation.

11. The image forming apparatus according to claim 1, wherein the hardware processor acquires information for the operation based on the second information from a storage medium connected to the image forming apparatus.

12. The image forming apparatus according to claim 1, further comprising:
   a tray that stores the recording medium; and
   a conveyor that comprises a roller and an endless belt and conveys the recording medium accommodated in the tray along a conveyance path, wherein
   the sensor is installed at a predetermined position on the conveyance path, and detects the property of the recording medium conveyed by the conveyor.

* * * * *